United States Patent [19]

Henson

[11] Patent Number: 4,612,949

[45] Date of Patent: Sep. 23, 1986

[54] APPARATUS FOR CONTROLLING WATER LEVEL

[76] Inventor: James H. Henson, 1431 E. Air Libre, Phoenix, Ariz. 85022

[21] Appl. No.: 700,470

[22] Filed: Feb. 11, 1985

[51] Int. Cl.⁴ .......................... F16K 21/18; F17D 3/00
[52] U.S. Cl. ........................................ 137/2; 137/392; 137/554; 137/624.13; 4/507; 4/508; 73/304 R; 73/313; 307/118; 340/620; 361/178
[58] Field of Search ................. 73/304 C, 304 R, 313; 137/1, 2, 11, 13, 392, 624, 554; 340/620, 623; 4/507, 508; 307/118; 361/178

[56] References Cited

U.S. PATENT DOCUMENTS

| 3,142,830 | 7/1964 | Patrick et al. | 73/304 R |
| 3,333,258 | 7/1967 | Walker et al. | 137/392 |
| 3,391,547 | 7/1968 | Kingston | 73/304 C |
| 4,099,406 | 7/1978 | Fulkerson | 73/304 R |
| 4,186,849 | 2/1980 | Spangler | 137/392 |
| 4,417,598 | 11/1983 | DePirro | 73/304 R |
| 4,445,238 | 5/1984 | Maxhimer | 137/393 |

*Primary Examiner*—G. L. Walton
*Attorney, Agent, or Firm*—Drummond & Nissle

[57] ABSTRACT

Apparatus for monitoring and controlling the level of fluid in a reservoir. The apparatus utilizes a fluid sensing probe to monitor the level of fluid in a reservoir and can generally be installed in an existing fluid reservoir without requiring structural modification of the reservoir. The apparatus, in determining the level of fluid in a reservoir, compensates for swells and other surface undulations which mask the true fluid level in the reservoir.

2 Claims, 6 Drawing Figures

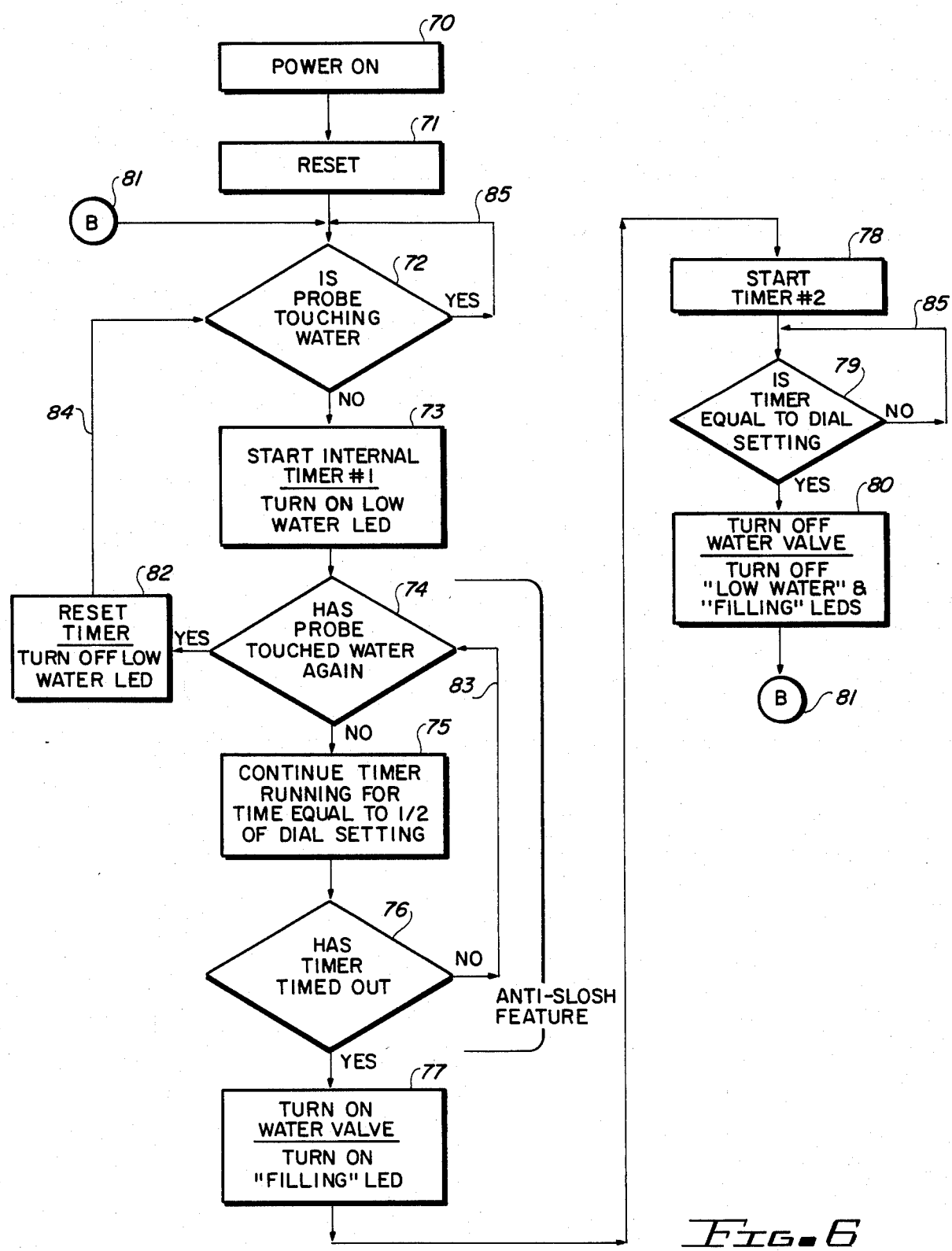

APPARATUS FOR CONTROLLING WATER LEVEL

This invention pertains to apparatus for monitoring and controlling the level of fluid in a reservoir.

More particularly, the invention pertains to water level control apparatus which can be readily installed in various types of fluid reservoirs without requiring that portions of the reservoirs be reconstructed or otherwise structurally modified.

In a further respect, the invention pertains to apparatus for controlling the level of water in a reservoir, the apparatus not requiring the utilization of moving parts which contact water in the reservoir and are therefore susceptible to being damaged by corrosion or by the accumulation of calcium and other mineral deposits on the moving parts.

In another respect, the invention pertains to water level control apparatus which, in determining when water should be added to a reservoir of water, takes into account and compensates for swells and other surface undulations which mask the true water level in the reservoir.

In yet a further respect, the invention pertains to water level control apparatus which utilizes an electrically conductive probe to monitor and control the water level in a reservoir.

Systems for monitoring and controlling the water level in a swimming pool or other fluid reservoir are well known in the art. However, such systems are not readily installed in an existing swimming pool because they require a significant amount of structural modification of the cool deck or walls of the swimming pool. In addition to being difficult to install, conventional water leveling systems are costly to maintain and often include moving parts which are, because they must continually contact swimming pool water, susceptible to damage caused by fatigue corrosion and the accumulation of calcium and other mineral deposits. One conventional water level control system is the POWER-STREAM automatic refill system, Model ARS-350 marketed by Flow-Rite Controls, Ltd. of 700 West 193rd Street, Glenwood, Ill. 60425. The POWER-STREAM system utilizes a pressure sensor positioned in the side wall of a swimming pool. The sensor detects the force generated against the sensor by the volume of water in the pool above the sensor. When the water level in a swimming pool decreases to a predetermined level, the sensor automatically opens a valve to add water to the pool. Installation of the POWER-STREAM system is costly because the pool must be drained, the earth adjacent the pool wall excavated, and the wall bored in order to install the pressure sensor. Maintenancing or replacing the sensor is equally expensive. Other conventional water leveling systems utilize floats which are susceptible to corrosion and to the accumulation of calcium and mineral deposits. Installation of float systems in existing swimming pools also normally requires additional concrete construction and the destruction and replacement of portions of existing pool walls and cool deck. Water level control systems utilizing electrical sensors are presently not favored for swimming pools because of safety considerations.

Accordingly, it would be highly desirable to provide an improved water level control system which could be quickly and inexpensively maintenanced and which could be readily installed on existing swimming pools by individuals of limited mechanical skill utilizing only simple conventional hand tools.

Therefore, it is a principal object of the invention to provide an improved system for controlling the level of fluid in a reservoir.

A further object of the invention is to provide an improved water level control system which can be quickly installed in existing swimming pools with conventional hand tools and without requiring structural modification of the walls or deck of the pools.

Another object of the instant invention is to provide an improved water level control system which is, after being installed in a fluid reservoir, readily maintenanced at minimal cost.

These and other, further and more specific objects and advantages of the invention will be apparent to those skilled in the art from the following detailed description thereof, taken in conjunction with the drawings, in which.

Figure 1:
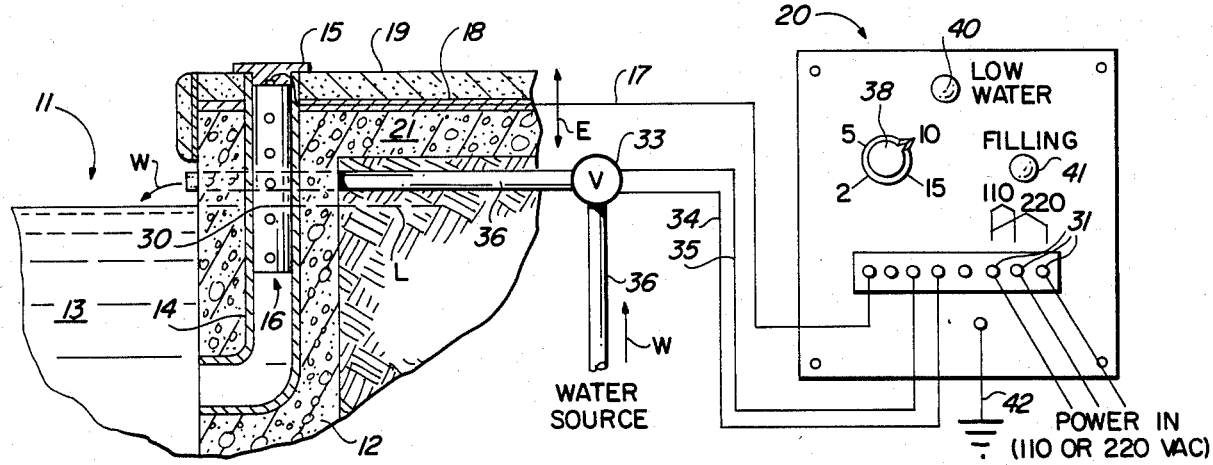
FIG. 1 is a schematic-section view illustrating a water level control system constructed in accordance with the principles of the invention and installed adjacent a swimming pool.

Briefly, in accordance with my invention, I provide improved apparatus for adding fluid to a reservoir, the reservoir normally being filled with water to a desired level therein. The apparatus includes a probe having a water sensing tip generally maintained in fixed position above the reservoir such that the sensing tip contacts the water when the reservoir is filled to the desired level and the sensing tip is spaced above the water when the reservoir is filled to a level lower than the desired level of water in the reservoir; a control unit in communication with the probe to monitor when the sensing tip is contacting water in the reservoir and when the sensing tip is spaced away from and not contacting water in the reservoir; a conduit through which water flows into the reservoir; and, a valve operatively associated with the control unit and positioned in the conduit. The valve has at least two operative positions, a normally closed position in which water is prevented from passing through the conduit into the reservoir, and an open position in which water flows through the conduit into the reservoir. The control unit moves the valve to the open position to permit water to flow through said conduit into the reservoir when the sensing tip of the probe is spaced away from and not contacting water in the reservoir.

In another embodiment of my invention, I provide an improved method for adding fluid to a reservoir. The reservoir is normally filled with water to a desired level therein and includes a deck adjacent at least a portion of the reservoir. The deck includes at least a pair of adjacent sections of material spaced apart from one another along a joint line. The improved method includes the steps of installing an electrically conductive probe, a control unit, and a conduit. The electrically conductive probe has a water sensing tip in fixed position above the water in the reservoir such that the sensing tip contacts the water when the reservoir is filled to the desired level, and the sensing tip is spaced above the water when the reservoir is filled to a level below the desired level. The control unit is positioned generally near the reservoir in electrical communication with the probe to monitor when the sensing tip is contacting water in the reservoir and when the sensing tip is spaced away from and not contacting water in the reservoir. The electrical communication between the probe and the control unit is provided by at least one electrically conductive wire extending from the probe along the joint line between the pair of sections of material to the control unit. The conduit directs water into the reservoir and includes a valve having at least two operative positions, a normally closed position in which water is prevented from passing through the conduit into the reservoir and an open position in which water flows through the conduit into the reservoir. After the probe, control unit and conduit are installed, the remaining step in the improved method of the invention is to open the valve when the control unit determines the water sensing tip is spaced away from and above the water in the reservior.

Turning now to the drawings, which depict the presently preferred embodiments of the invention for the purpose of illustrating the practice thereof and not by way of limitation of the scope of the invention, and in which like reference characters refer to corresponding elements throughout the several views, FIG. 1 illustrates a water level control system constructed in accordance with the principles of the invention for a swimming pool generally indicated by reference character 11 and including wall 12 enclosing electrically grounded water 13 having a desired level within wall 12 indicated by horizontal line L. Cylindrical L-shaped standpipe 14 in wall 12 includes removable cap 15. Probe unit 16 is detachably fixedly affixed to the bottom of cap 15. Wire 17 from probe unit 16 extends from standpipe 14 through expansion joint 18 in deck 19 to control unit 20. Wire 17 can, instead of being coursed through expansion joint 18, be directed from standpipe 14 through a hollow piece of PVC or other conduit buried in or below deck 19. While expansion joint 18 is illustrated in FIG. 1 as being a generally horizontally oriented layer between deck 19 and deck support foundation 21, it is understood that in the cool deck surrounding most swimming pools each expansion joint comprises a vertical panel shaped space between adjacent slabs of cool deck or concrete. Wire 17 would therefore, in most existing pools, extend through a vertical panel shaped expansion joint space between a pair of adjacent concrete slabs to the edge of the cool deck. From the edge of the cool deck wire 17 would preferably extend through a hollow buried conduit to control unit 20.

Figure 5:
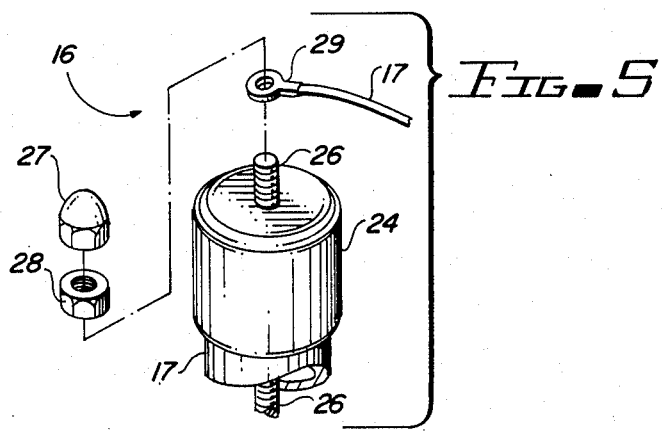
FIG. 5 is an enlarged perspective assembly view of a portion of the water sensing probe of FIG. 2; and, FIG. 6 is a flow chart illustrating a typical program or logic function utilized in accordance with the presently preferred embodiments of the invention.
Figure 2:
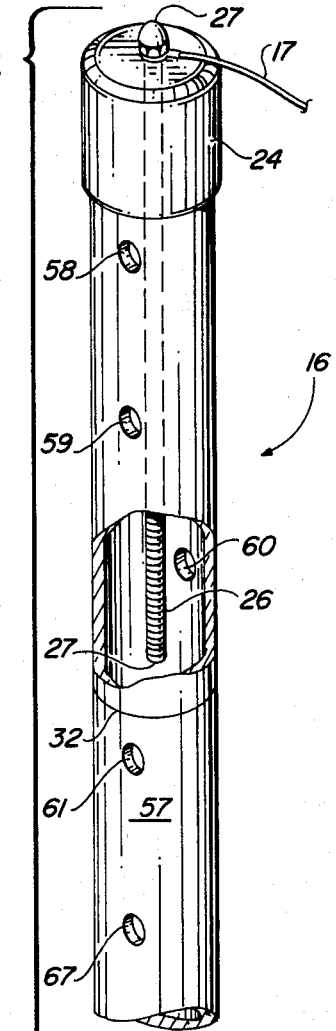
FIG. 2 is a perspective view illustrating the water sensing probe of the apparatus of FIG. 1 and partially broken away to illustrate interior construction thereof.

As shown in FIGS. 2 and 5, probe unit 16 includes hollow cylindrical housing 57 having aperture 58-63 formed therethrough. Caps 24, 25 snap onto the top and bottom of housing 57, respectively. Electrically conductive externally threaded brass probe 26 is secured to cap 24 by nuts 27, 28. Metal contact 29 crimped onto wire 30 contacts probe 26 and is compressed between the top of cap 24 and nut 28. In FIG. 1, probe unit 16 is positioned such that tip 27 of probe 26 is at point 30 on line L, i.e., tip 27 is at the desired water level of reservoir 11. Line 32 on the exterior of housing 57 indicates the position of tip 27 of probe 26 in housing 57 and, consequently, indicates the preferred level L of water 13 on probe housing 57 when housing 57 is in standpipe 14.

Control unit 20 includes electrical contacts 31 which receive power from a 110 or 220 VAC power source. Lines 34, 35 electrically connect control unit 20 to normally closed valve 33 in water supply conduit 36. Control unit 20 must, along with water 13, be grounded 42 in order for probe unit 16 to function correctly. During operation of the apparatus of FIG. 1, valve 33 is automatically opened and closed by control unit 20. Time dial 38 can be set to two, five, ten or fifteen minutes and indicates the length of time control unit 20 will open valve 33 when probe unit 16 indicates to unit 20 via wire 17 that the level of water 13 is below the desired level indicated by line L. LED 40 turns on when the level of water 13 is below the desired L and below tip 27 of probe 26. LED 41 lights when control unit 20 opens valve 33 to permit water to flow through conduit 36 into reservoir 11 as indicated by arrows W. Valve 33 is not opened by control unit 20 until LED 40 has been lit for a pre-selected period of time. It is presently preferred that control unit 20 not open valve 33 until probe tip 27 has not contacted water 13 for a period of time equivalent to one-half of the time setting of knob 38. For example, in FIG. 1 knob 38 is set at ten minutes. Consequently, control unit 20 opens valve 33 after probe tip 27 has not contacted water 13 for a continuous period of five minutes. As soon as tip 27 of probe 26 has not contacted water 13 for five minutes, the microprocessor in control unit 20 opens valve 33 for ten minutes and then closes valve 33.

Figure 3:
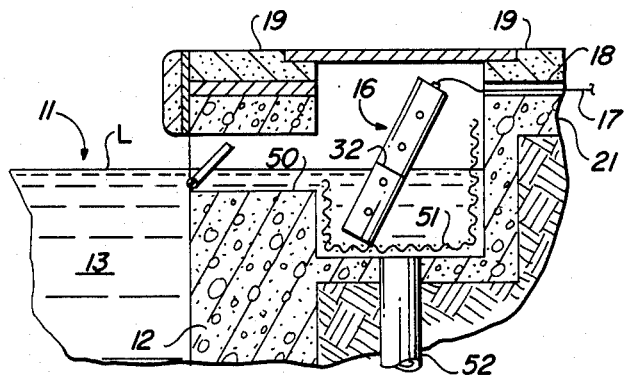
FIG. 3 is a section view illustrating the presently preferred embodiment of the water level control system of the invention installed in an existing swimming pool.

A conventional swimming pool 11 skimmer 50 with filter basket 51 is illustrated in FIG. 3. Conduit 52 carries water 13 to the pool pump and filter unit (not shown). In FIG. 3 the water in pool 11 is at the desired level L. Probe 16 is installed in filter basket 51 by removing cap 25 and cutting off an appropriate portion of housing 57 such that after cap 25 is replaced on housing 57 and probe 16 is positioned in the bottom of basket 51, line 32 on housing 57 and tip 27 of probe 26 are generally positioned at the desired water level L. Wire 17 extends through expansion joint 18 to control unit 20 (not shown in FIG. 3). Control unit 20, in a manner similar to that described in conjunction with FIG. 1, automatically controls a valve 33 to direct water through a conduit 36 into pool 11 when the level of water 13 therein falls below the desired level L for a selected period of time.

Figure 4:
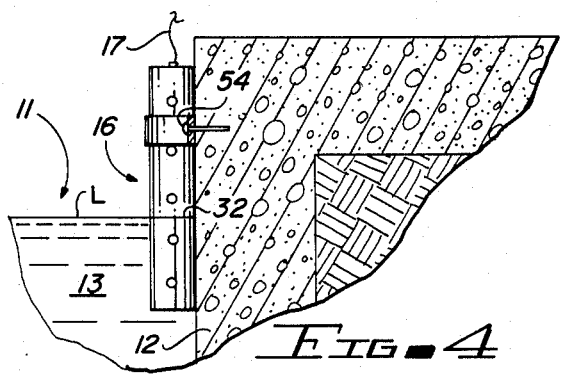
FIG. 4 is a partial section view of a water reservoir illustrating yet another embodiment of the invention.

In FIG. 4, probe unit 16 has been secured to the side of pool wall 12 with U-shaped clamp 54. The level of water 13 illustrated in FIG. 4 is the desired level L of the water. Unit 16 is positioned on wall 12 such that line 32 on housing 57 and tip 26 of probe 27 are positioned at the desired water level. In FIG. 4, wire 17 lead to control unit 20 (not shown) which, in a manner similar to that described in conjunction with FIG. 1, automatically controls a valve 33 to direct water through a conduit 36 into pool 11 when the level of water 13 therein falls below the desired level L for a selected period of time.

FIG. 6 is a block flow diagram which illustrates a typical program or logic function executed by the microprocessor in control unit 20 during operation of the water level control systems of FIGS. 1, 3 and 4. After power to the control unit 20 is turned on 70, the basic control program consists of commands to "RESET, START AND INITIALIZE" 71; to determine if the "PROBE TIP 27 IS TOUCHING THE WATER" 72; to, when the probe tip 27 is not contacting water, "START INTERNAL TIME #1" and "TURN ON LOW WATER LED 40"; to periodically continually permit internal timer #1 to run for a preselected period of time and then determine if the "PROBE HAS TOUCHED WATER AGAIN" 74; to, if the probe tip 27 has not touched the water, "CONTINUE THE TIME #1 RUNNING FOR A TIME EQUAL TO ONE-HALF OF THE TIME SETTING OF DIAL 38" 75; to determine when "TIMER HAS RUN" 76 for a period of time equal to one-half of the time setting of dial 38; to, after internal time #1 has timed out, "TURN ON WATER VALVE 33 AND TURN ON FILLING LED 41" 77; to, after turning on valve 33, "START INTERNAL TIME #2" 78; to continually periodically monitor if internal timer #2 has run for the period of time selected by dial 38, i.e., to determine if "ELAPSED TIME IS EQUAL TO SETTING OF DIAL 38" 79; to, after internal timer #2 has run for a period of time equal to the setting of dial 38, "TURN OFF VALVE 33 AND TURN OFF LED's 40, 41" 80; and, after valve 33 and LED 41 have been turned off, to return 81 to command block 72. If during command block 72 the microprocessor determines that tip 27 of probe unit 16 is touching water 13, then the microprocessor repeats 85 the query "IS PROBE TOUCHING WATER" after a selected, normally short, period of time has passed. If while timer #1 is running for a period of time equal to one-half of the time setting of dial 38 the probe tip 27 touches the water, then the microprocessor will "RESET TIMER AND TURN OFF LOW WATER LED" 82 and return 84 to control block 72. If when the microprocessor determines whether "TIMER #1 HAS TIMED OUT" 76, the timer has not run for an uninterrupted continuous period of time equal to one-half of the time setting of dial 38, the microprocessor logic returns 83 to control block 74. If when the microprocessor queries whether the elapsed time of timer #2 is "EQUAL TO DIAL SETTING 38" 79, the continuous uninterrupted elapsed time of timer #2 is less than and not equal to the time setting of dial 38, then the microprocessor repeats 85 the query after a selected, normally short, period of time has passed. In FIG. 6, logic blocks 74–76 are intended to compensate for waves or wave troughs moving past sensing tip 27 and giving a false indication of the level of water or other fluid in a reservoir.

As would be appreciated by those of skill in the art, probe unit 16 can sense water 13 in a reservoir 11 by means other than electrical conduction. For instance, a light optic system could be utilized to direct a beam of light across s small space at the water sensing tip of the probe. When the probe tip was contacting water the light beam would be interrupted. When the tip was above and not contacting water 13 in a reservoir 11, the light beam would not be interrupted. Further, probe unit 16 does not have to be physically connected to control unit 20 by electrical wiring. Radio or light optic signals from probe unit 16 could be generated and transmitted from probe unit 16 to control unit 20 to indicate when the tip of the probe was or was not contacting water 13 in reservoir 11.

Having described my invention in such terms as to enable those skilled in the art to which it pertains to understand and practice it, and having described the presently preferred embodiments thereof,

I claim:

1. Apparatus for adding fluid to a reservoir, said reservoir normally being filled to a desired level therein, said apparatus including
   (a) a probe having a fluid sensing tip generally maintained in fixed position above said reservoir such that
      (i) said sensing tip contacts the fluid when said reservoir is filled to said desired level therein, and
      (ii) said sensing tip is spaced above the fluid when said reservoir is filled to a level lower than said desired level of fluid therein;
   (b) a control unit in communication with said probe to monitor
      (i) when said sensing tip is contacting fluid in said reservoir, and
      (ii) when said sensing tip is spaced away from and not contacting fluid in said reservoir, said control unit including timing means for determining the amount of time since said sensing tip has last contacted fluid in said reservoir;
   (c) a conduit through which fluid flows into said reservoir; and,
   (d) a valve operatively associated with said control unit and positioned in said conduit, said valve having at least two operative positions,
      (i) a normally closed position in which fluid is prevented from passing through said conduit into said reservoir, and
      (ii) an open position in which fluid flows through said conduit into said reservoir,
   said control unit
      determining when said amount of time determined by said timing means is equivalent to a preselected period of time, and
      when said fluid sensing tip has not contacted said fluid for said preselected period of time, moving said valve to said open position to permit fluid to flow through said conduit into said reservoir when said sensing tip of said probe is spaced away from and not contacting fluid in said reservoir, if the amount of time since said sensing tip has last contacted said fluid is less than said preselected period of time due to said fluid contacting said sensing tip, not moving said valve to said open position.

2. A method for adding water to a reservoir, said reservoir normally being filled with water to a desired level therein and including a deck adjacent at least a portion of said reservoir, said deck including at least a pair of adjacent sections of material spaced apart from one another along a vertically oriented panel shaped joint space, said method including the steps of
   (a) installing
      (i) an electrically conductive probe having a water sensing tip in fixed position above the water in said reservoir such that
         said sensing tip contacts said water when said reservoir is filled to said desired level, and
         said sensing tip is spaced above said water when said reservoir is filled to a level below said desired level;
      (ii) a control unit generally near said reservoir and in electrical communication with said probe to monitor when said sensing tip is contacting water in said reservoir, and when said sensing tip is spaced away from and not contacting water in said reservoir, electrical communication between said probe tip and said control unit being provided by at least one electrically conductive wire extending from said probe through said joint space between said pair of sections of material to said control unit, (iii) timing means in communication with said probe and said control unit, said timing means determining the amount of time since said sensing tip has last contacted fluid in said reservoir, said control unit determining when said amount of time determined by said timing means is equivalent to a preselected period of time;

(iv) a conduit for directing water into said reservoir, said conduit including a valve positioned therein and having at least two operative positions, a normally closed position in which water is prevented from passing through said conduit into said reservoir, and an open position in which water flows through said conduit into said reservoir; and, (b) opening said valve when said control unit determines said water sensing tip has not contacted fluid in said reservoir for said preselected period of time, if the amount of time since said sensing tip has last contacted said fluid is less than said preselected period of time due to said fluid contacting said sensing tip, not opening said valve.

* * * * *